Dennis L. Radtke
INVENTOR.

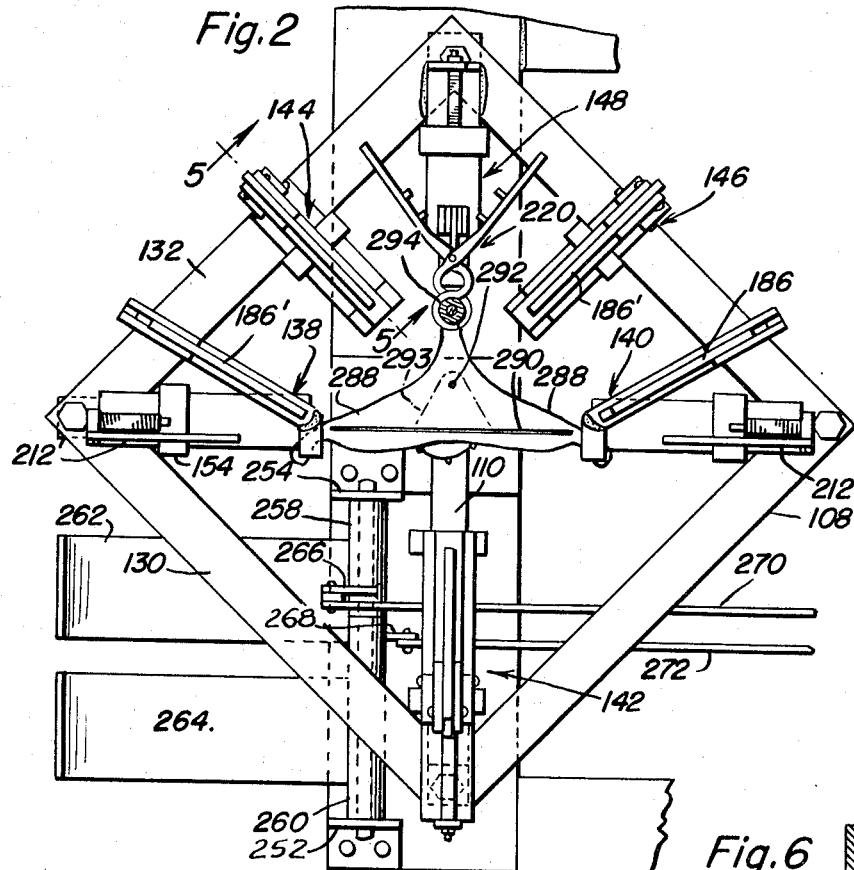
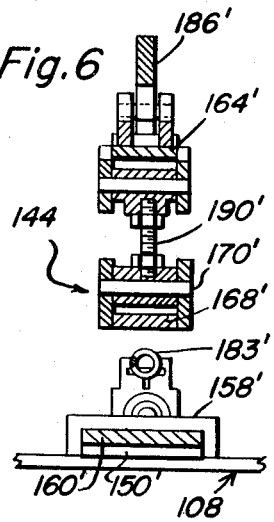
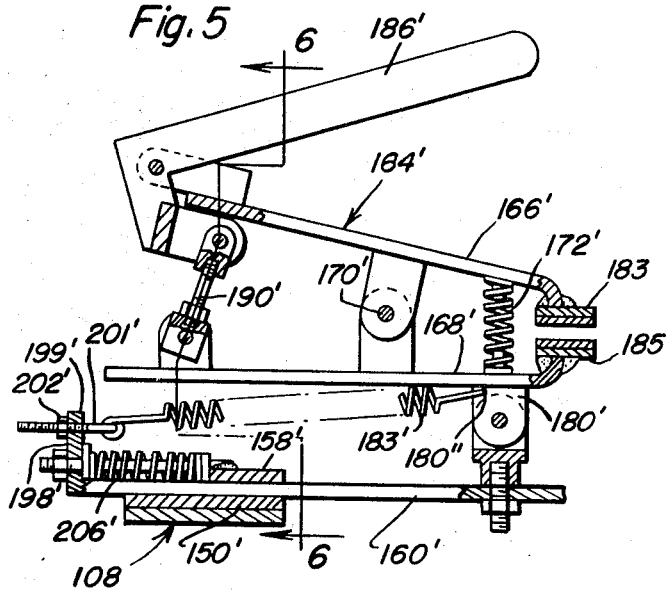
Dennis L. Radtke
INVENTOR.

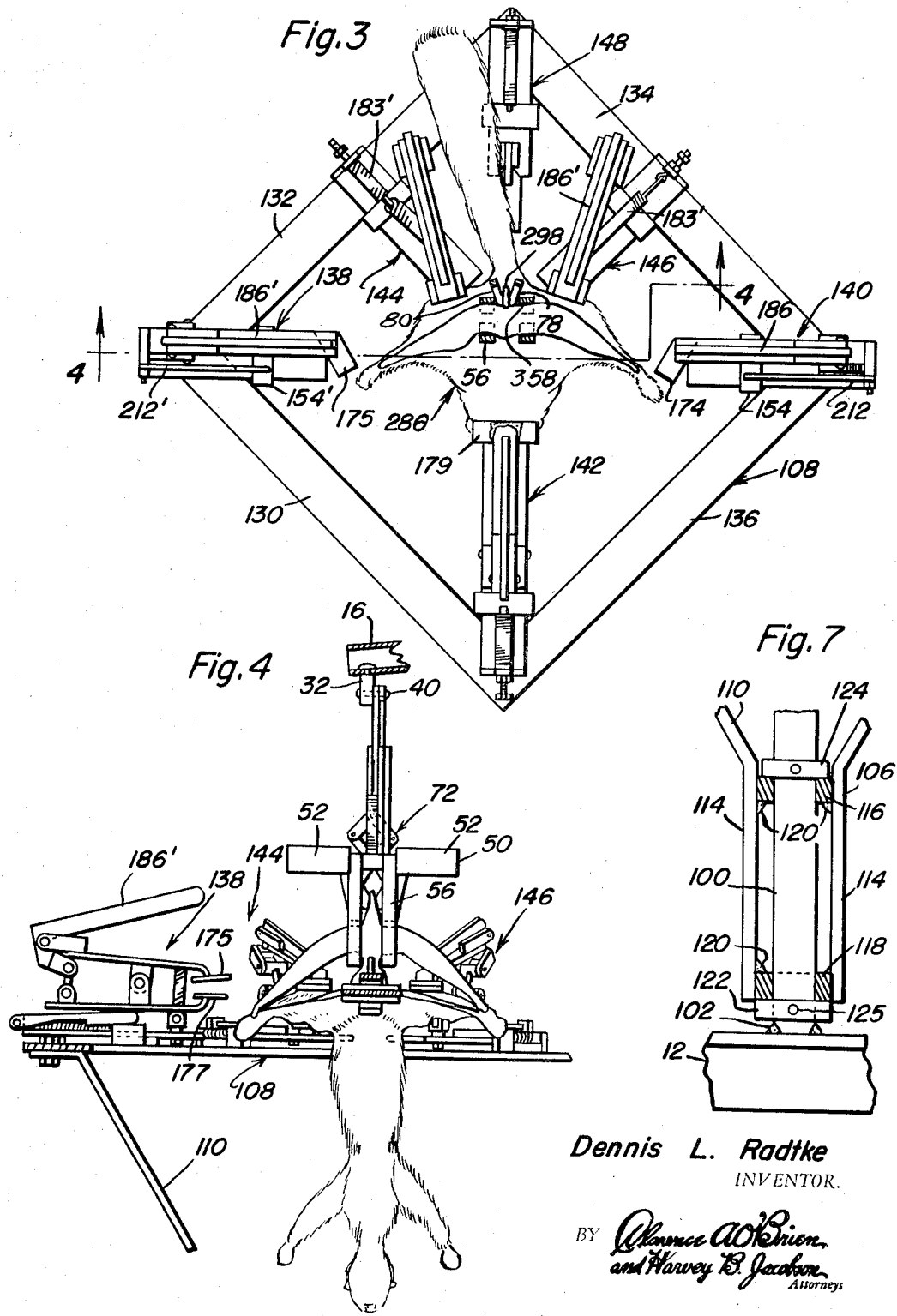

Dennis L. Radtke
INVENTOR.

United States Patent Office 3,443,275
Patented May 13, 1969

3,443,275
MINK SKINNING MACHINE
Dennis L. Radtke, Benson, Minn.
(112½ W. 7th St., Morris, Minn. 56267)
Filed Nov. 29, 1966, Ser. No. 597,708
Int. Cl. A22b 5/16
U.S. Cl. 17—21                               15 Claims

ABSTRACT OF THE DISCLOSURE

This disclosure pertains to a supporting structure including anchor means spaced radially outwardly of and circumferentially about an axis along which an animal to be skinned is to be moved. The anchor means are shiftable radially of the aforementioned axis and are adapted to engage adjacent portions of the skin of the animal whereby the skin may be peeled from the carcass of the animal as the latter is moved along said axis.

---

This invention relates to a novel and useful skinning machine and more specifically to a skinning machine designed primarily to greatly facilitate the task of skinning small animals such as minks. The machine of the instant invention includes first means for supporting a mink in a position advantageous to initial cutting of the mink skin along the insides of the rear legs of the mink and also operable to clampingly engage a selected portion of the skin of the mink adjacent the initial cut. In addition, the machine of the instant invention includes second means operable to be slipped through the initial cut made in the skin of the mink and to frictionally grip the carcass of the mink inwardly of the corresponding skin portion thereof and to pull the mink carcass relative to the aforementioned first means so that the carcass of the mink may be stripped from or pulled out of the skin of the mink. The first means operable to clampingly engage the skin of the mink comprise clamps spaced radially outwardly of and circumferentially about the path along which the second means is operable to pull the carcass of the mink. Further, the clamps for clampingly engaging the mink skin are shiftable between limit positions generally radially of the aforementioned path and are yieldingly urged toward their radial outermost positions whereby the tension on the mink skin of the carcass is being pulled therefrom is substantially evenly distributed about the mink carcass.

The main object of this invention is to provide a mink skinning machine which will greatly facilitate the skinning of a mink and which will enable a mink skinning operation to be carefully completed by a skilled person in less than two minutes.

Another object of this invention is to provide a mink skinning machine which, in addition to providing means for pulling the carcass of a mink from its skin, includes means for supporting the mink in position in which the initial opening cut along the inside of the rear legs of the mink may be readily accomplished.

Still another object of this invention, in accordance with the immediately preceding object, is to provide a mink skinning machine which, in addition to including means for supporting a mink in an advantageous position for making the initial opening cut in the skin of the mink, includes means operable to clampingly engage the skin of the mink adjacent the initial opening cut with the mink still remaining in its initially supported position.

A further object of this invention is to proivde a mink skinning machine constructed in a manner whereby the tension on the skin of the mink being pulled from the mink carcass is substantially fully and evenly distributed throughout the portions of the mink skin immediately adjacent the mink carcass.

A still further object of this invention is to provide a mink skinning machine including a clamp-type carcass extracter provided with cooperable clamping jaws suitably contoured along their remote surfaces so as to be adapted to be inserted within the first skinned portion of the mink skin for engagement with the mink carcass without damage to the mink skin.

Another object of this invention is to provide a mink skinning machine in accordance with the preceding objects and including skin clamping assemblies suitably cushioned on the surfaces thereof adapted to engage the fur side of the skin.

Still another object of this invention is to provide a mink skinning machine including control means for shifting the position of the carcass extracter relative to the skin gripping clamp of the machine and which are readily operable by an operator of the machine utilizing both hands to assist in the process of peeling the skin from the carcass of the mink.

A final object of this invention to be specifically enumerated herein is to provide a mink skinning machine in accordance with the preceding objects and which will conform to conventional forms of manufacture, be of simple construction and easy to use so as to provide a device that will be economicaly feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is an enlarged fragmentary top plan view taken substantially upon the plane indicated by the section line 2—2 of FIGURE 1 and illustrating the manner in which the initial or opening cut in the mink skin is made along the rear or inner portions of the rear legs of the mink;

FIGURE 3 is a fragmentary plan view similar to FIGURE 2 but illustrating the manner in which the belly and outer side portions of the skin of the mink are clamped in three of the clamps of the machine and the jaws of the carcass extracter are clamped about the base portion of the rear legs of the mink while forward jaws of the extracter are engaged with the tail bone of the mink;

FIGURE 4 is a fragmentary vertical sectional view taken substantially upon the plane indicated by the section line 4—4 of FIGURE 3;

FIGURE 5 is an enlarged fragmentary vertical sectional view taken substantially upon the plane indicated by the section line 5—5 of FIGURE 2;

FIGURE 6 is a vertical sectional view taken substantially upon the plane designated by section line 6—6 of FIGURE 5;

FIGURE 7 is an enlarged fragmentary vertical sectional view taken substantially upon the plane indicated by section line 7—7 of FIGURE 1;

Figure 1:
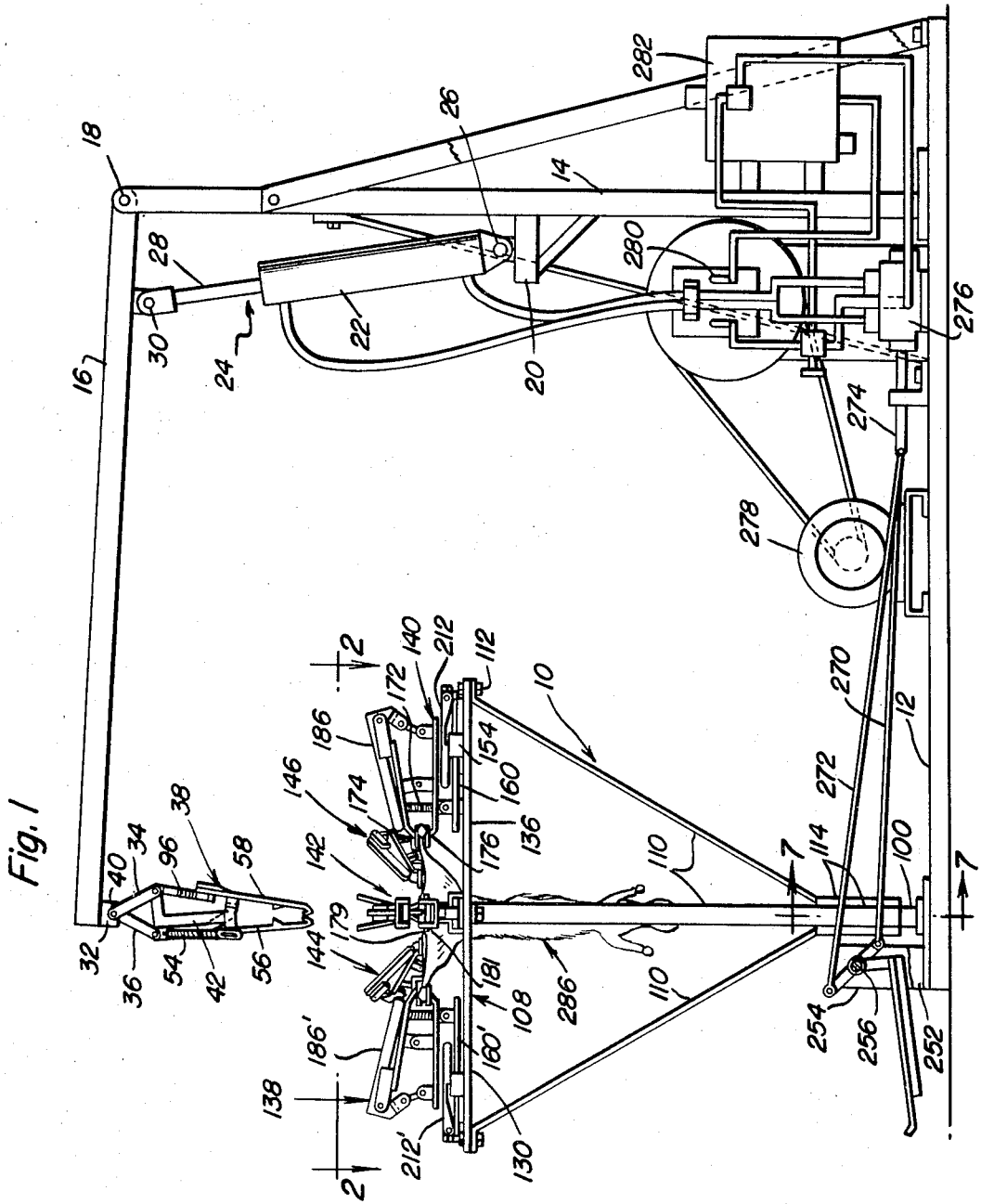
FIGURE 1 is a side elevational view of the mink skinning machine with a mink supported from the machine in the position in which the initial or opening cut is made along the inside of the rear legs of the mink.

Referring now more specifically to the drawings the numeral 10 generally designates the mink skinning machine of the instant invention. The machine 10 includes a base 12 to which the lower end of an upstanding upright 14 is secured in any convenient manner. One end of a laterally projecting support arm 16 is pivotally secured to the upper end of the upright 14 as at 18 and the upright 14 includes a laterally directed support member 20 intermediate its upper and lower ends, the base end of the cylinder portion 22 of an extendible fluid motor generally referred to by the reference numeral 24 being pivotally secured to the support member 20 as at 26 and the extendible end of the piston rod portion 28 of the extendible fluid motor 24 being pivotally secured to the support arm 16 as at 30.

The outer or free end of the support arm 16 includes a depending apertured mounting flange 32 to which the actuating links 34 and 36 of a carcass extracter generally referred to by the reference numeral 38 are pivotally secured as at 40.

Figure 8:
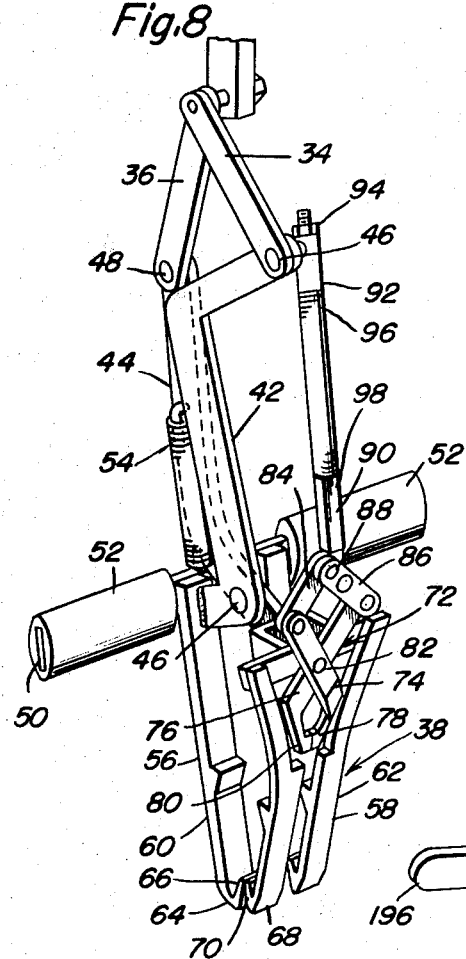
FIGURE 8 is a perspective view of the carcass extracter clamp assembly of the invention.
Figure 9:
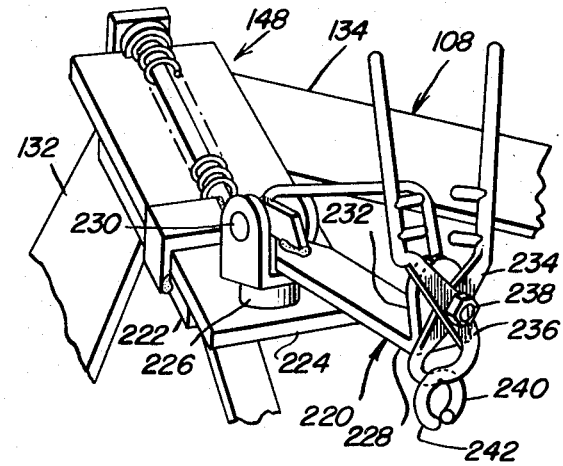
FIGURE 9 is a perspective view of the portion of the clamp supporting frame of the invention from which the tail pulling clamp is supported.

The carcass extracter 38, with attention now directed more specifically to FIGURE 8 of the drawings, includes a pair of crossed levels 42 and 44 pivotally secured together as at 46. The levers 42 and 44 include one pair of ends which are pivotally secured to the actuating levers 34 and 36, respectively, as at 46 and 48 and the lever 42 includes a lateraly extending handle 50 provided with opposite end hand grip members 52. The weight of the carcass extracter 38 of course has a tendency to swing the actuating levers 34 and 36 toward generally parallel positions. In addition, a compression spring 54 is operatively connected between the levers 42 and 44 and serves to yieldingly urge the upper ends of the levers 42 and 44 toward each other.

The lower ends of the levers 42 and 44 include double armed confronting jaws 56 and 58. The jaw 56 includes a pair of arms 60 and the jaw 58 includes a pair of arms 62. The lower ends of the arms 60 are curved inwardly toward the arms 62 as at 64 and terminate in upwardly angulated hooked end portions 66 while the lower ends of the arms 62 curve toward the arms 60 as at 68 and terminate in upwardly angulated hooked end portions 70. The curved portions 64 and 66 of the arms 60 and 62 enable the lower ends of the jaws 56 and 58 to be inserted within the skin of a mink through the initial cut made therein without damaging the mink skin. Further, the hooked end portions 66 and 70 are provided to frictionally grip the carcass of the mink whereby the carcass extracter 38 may be utilized to withdraw the carcass of a mink from the mink skin.

The jaw 58 further includes a tail bone pulling assembly generally referred to by the reference numeral 72 and including crossed levers 74 and 76 including confronting jaw portions 78 and 80 at one pair of corresponding ends and pivotally interconnected and pivotally secured to the jaw 58 as at 82. The ends of the levers 74 and 76 remote from the jaw portions 78 and 80 are interconnected by means of links 84 and 86 pivotally secured to the links or levers 74 and 76, respectively, at one pair of corresponding ends and pivotally secured to each other as at 88 and to one end of an actuating rod 90 at the other pair of ends. The end of the actuating rod 90 remote from the links or levers 84 and 86 is slidably received through a tubular member 92 pivotally secured to the upper end of the lever 42 by means of the fastener 46. The rod 90 includes a stop abutment 94 threadedly engaged therewith on the side of the tubular member 92 remote from the links 84 and 86 and a compression spring 96 is disposed about the rod 90 between the tubular member 92 and a diametrically enlarged end portion 98 on the end of the rod 90 remote from the threaded abutment 94. Accordingly, the compression spring 96 tends to slightly part the jaw portions 78 and 80, the abutment 94 limiting the spacing between the jaw portions 78 and 80.

Because of the relationship of the actuating links 34 and 36 and the levers 42 and 44 as well as the cooperating relationship between the links 84 and 86 and the levers 74 and 76, any tendency for the mounting flange 32 to be raised relative to stationary objects engaged between the jaws 56 and 58 and the jaw portions 78 and 80 tends to cause the jaws 56 and 58 as well as the jaw portions 78 and 80 to more tightly grip the elements disposed therebetween. However, slight upward force applied to either of the handgrips 52 has a tendency to open the jaws 56 and 58 and also the jaw portions 78 and 80 so that these jaws and jaw portions may be readily positioned about elements which are to be engaged thereby.

Referring now more specifically to FIGURES 1, 2 and 7 it may be seen that the machine 10 includes an upstanding pivot post 100 whose lower end is secured to the base 12 in any convenient manner such as by welding 102. A generally rectangular support frame is referred to in general by the reference numeral 108 and is supported in horizontal position from the post 100 by means of four depending and downwardly converging legs 110 secured to the four corners of the frame 108 in any convenient manner such as by fasteners 112 at their upper ends and including generally parallel angulated lower end portions 114 disposed about and secured to the outer peripheral portions of a pair of upper and lower journal sleeves 116 and 118 in any convenient manner such as by welding 120. The sleeves 116 and 118 are axially spaced apart longitudinally of the angulated end portions 114 and are journaled on the post 100 and disposed above and below the upper and lower ends of a pair of lower and upper sleeves 122 and 124, respectively, adjustably secured on the post 100 by means of similar setscrews 125 so as to retain the sleeves 116 and 118 on the post 100. Accordingly, the support frame 108 is supported from the base 12 for rotation about an upstanding axis passing through the center of the area bounded by the frame 108.

The frame 108 includes four generally equal length sides 130, 132, 134 and 136 disposed at generally right angles to the adjacent sides so as to form the four corners to which the upper ends of the legs 110 are secured. The frame 108 includes a pair of leg clamp assemblies generally referred to by the reference numerals 138 and 140, a belly skin clamp assembly generally referred to by the reference numeral 142, a pair of rear thigh skin clamp assemblies generally referred to by the reference numerals 144 and 146, and a tail holding and clamping assembly generally referred to by the reference numeral 148.

The leg clamp assemblies 138 and 140 are supported from opposite corner portions of the frame 108 and the clamp assembly 140 is supported from one of the other corners of the frame 108. Further, the clamp assemblies 144 and 146 are supported from the sides 132 and 134 intermediate the clamp assemblies 138 and 140 and the clamp assembly 148.

The clamp assemblies 138 and 140, which are adapted to engage the pads of the rear legs of the mink as will be hereinafter more fully set forth, are substantially identical in construction except that they are right and left handed and accordingly, only the structure of the clamp assembly 140 will be set forth herein in detail.

Figure 10:
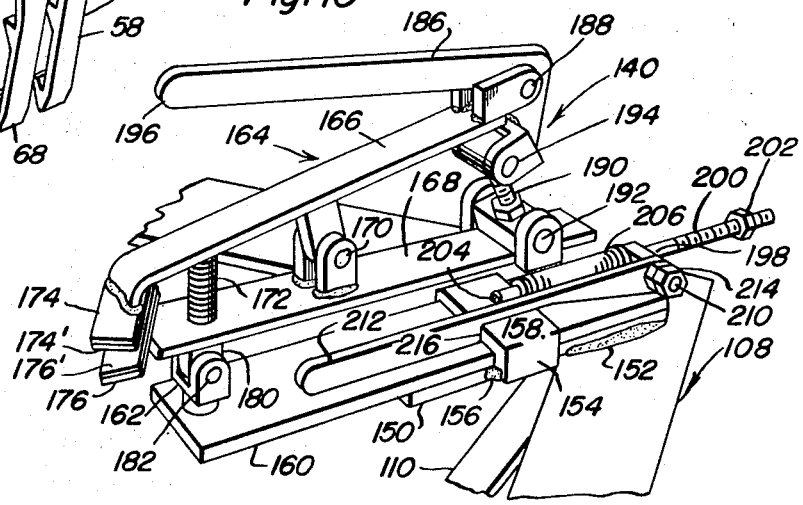
FIGURE 10 is a fragmentary perspective view of the portion of the clamp supporting frame of the invention from which the right leg supporting clamp is supported.

The clamp assembly 140, with attention now directed more specifically to FIGURE 10 of the drawings, includes a mounting flange 150 which is secured to the corner portion of the frame 108 defined between the sides 134 and 136 in any convenient manner such as by welding 152. The mounting flange 150 has an inverted U-shaped strap iron or steel member 154 secured thereto in any convenient manner such as by welding 156 and the member 154 includes a bight portion 158 which is spaced above the upper surface of a mounting flange 150 and which therefore defines a tubular guide in which the base flange 160 of the clamp assembly 140 is longitudinally slidably disposed for guided movement generally radially of the axis of rotation of the frame 108. The inner end of the base flange 160 has a bifurcated mount 162 pivotally secured thereto for rotation about an upstanding axis and the clamp assembly 140 includes a clamp structure generally referred to by the reference numeral 164 defined by a pair of pivotally connected levers 166 and 168. The levers 166 and 168 are pivotally interconnected intermediate their opposite ends as at 170 and a compression spring 172 is disposed between the jaw ends of the levers 166 and 168 which include opposed angulated jaw elements 174 and 176.

The jaw elements 174 and 176 are inclined relative to the longitudinal axes of the levers 166 and 168 so as to be initially inclined relative to corresponding radii of the axis of rotation of the support frame 108, the corresponding jaw elements of the clamp assembly 138 being oppositely inclined.

The lever 168 includes a depending lug 180 which is pivotally secured to the bifurcated mount 162 as at 182 and, accordingly, the clamp structure 164 may be swung relative to the base flange 160 about an upstanding axis upon angular adjustment of the mount 162 and may also be swung about a horizontal axis upon angular displacement of the lug 180 relative to the mount 162. The clamp structure 164 includes an angulated actuating lever 186 pivotally secured to the end of the lever 166 remote from the jaw element 174 as at 188 and a toggle link 190, which is adjustable in length, is pivotally connected at one end to the end of the lever 168 remote from the jaw element 176 as at 192 and pivotally secured to the actuating lever 186 at the other end as at 194. Accordingly, upon downward swinging movement of the free end 196 of the actuating lever 186 the ends of the levers 166 and 168 remote from the jaw elements 174 and 176 will be swung apart and the jaw elements 174 and 176 will be moved toward each other, the confronting surfaces of the jaw elements 174 and 176 being provided with suitable cushioning members 174' and 176', respectively. Further, the outermost end of the base flange 160 includes an upturned end portion 198 which is apertured so as to slidingly receive therethrough a push rod 200, the outer end of the push rod 200 having a threaded abutment 202 threadedly engaged therewith and the inner end of the push rod 200 being secured to the bight portion 158 as at 204 and a compression spring 206 being disposed about the inner end of the rod 200 between the bight portion 158 and the flange 198 so as to urge the base flange 160 to a radial outermost position relative to the axis of rotation of the frame 108 defined by the adjustable stop abutment or fastener 202. Still further the flange 198 includes a laterally projecting pivot shaft 210 on one end on which a locking lever 212 is pivotally secured by means of fasteners 214, the locking lever 212 including a shoulder 216 spaced intermediate its opposite ends for engagement with the bight portion 158 to releasably retain the base flange 160 in a radially inwardly shifted position relative to the axis of rotation of the frame 108. Inasmuch as the clamp assembly 138 is substantially the same in construction as the clamp assembly 140 except for the clamp assemblies being right and left handed and the jaw elements thereof being oppositely inclined, the various components of the clamp assembly 138 have been given reference numerals corresponding to the reference numerals given the same components of the clamp assembly 140 with the exception that the jaw elements of the clamp assembly 138 corresponding to the jaw elements 174 and 176 are designated by the reference numerals 175 and 177, respectively, see FIGURE 4.

In addition to a similarity existing between the clamp assemblies 138 and 140 the clamp assembly 142 as well as the clamp assemblies 144 and 146, which are identical, include components corresponding directly to the components of the clamp assembly 140 and which have therefore been designated by corresponding prime numerals. However, the jaw elements of the clamp assembly 142 are wider, extend transversely of the corresponding levers 166' and 168' and are designated by the reference numerals 179 and 181 and the jaw elements of the clamp assemblies 144 and 146 corresponding to the jaw elements 174 and 176 of the clamp asembly 140 are designated by the reference numerals 183 and 185, respectively, and extend transversely of the levers 166' and 168' see FIGURES 2–5. Further, the flange 198' of each clamp assembly 144 and 146 includes an extension 199, through which an anchor 201' is secured by means of an adjustable threaded fastener 202. Further, the depending mounting lug 180' of each clamp assembly 144 and 146 is suitably apertured as at 180'' and an expansion spring 183' is secured between each apertured leg 180' and the corresponding anchor 201' so as to yieldingly urge each of the clamp structures 164' toward an adjusted angular position about a vertical axis relative to the corresponding base flange 160' generally paralleling the latter. Further, the flanges 198' of the clamp assemblies 142, 144 and 146 do not include locking levers corresponding to the locking levers 212 carried by the clamp assemblies 138 and 140.

The clamp assembly 148 includes a clamp structure generally referred to by the reference numeral 220 and its mounting portion includes a mounting flange 222 corresponding to the mounting flange 150 and a spring urged base flange 224 corresponding to the base flanges 160 and from which the clamp structure 220 is pivotally supported for rotation about an upstanding axis by means of a bifurcated mount 226 pivotally supported from the base flange 224. The clamp structure 220 includes a support arm 228 having one end pivotally supported between the furcations of the bifurcated mount 226 as at 230 and the other end of the support arm 228 includes an upturned flange portion 232 to which the crossed levers 234 and 236 pivotally secured by means of a pivot fastener 238 secured through the flange 232 and the levers 234 and 236. The fastener 238 defines a friction pivotal connection between the levers 234 and 236 and may be tightened so as to frictionally retain the levers 234 and 236 in adjusted relative positions to each other and the flange 232.

The levers 234 and 236 include generally semi-circular opposing jaw portions 240 and 242, respectively, which open toward each other and which are adapted to fully encircle and frictionally grip the tail of a mink which is to be skinned as will be hereafter more full set forth.

The base 12 includes a pair of upstanding mounting flanges 252 and 254, see FIGURE 2, between which a support shaft 256 having a pair of sleeves 258 and 260 journalled thereon extends. The sleeves 258 and 260 include foot treadle portions 262 and 264, respectively, provided with actuating arms 266 and 268. The free ends of the actuating arms or levers 266 and 268 have control rods 270 and 272 pivotally secured thereto at corresponding ends and the remote ends of the rods 270 and 272 are connected to suitable control actuators 274 of a value control assembly 276 supported from the base 12. A motor 278 is also supported from the base 12 and drives a fluid pump 280. The pump 280 is operatively communicated with a fluid reservoir 282 and the valve control assembly 276 by suitable fluid conduits. Further, the valve control assembly 276 is communicated with the opposite ends of the cylinder portion 22 of the extendible motor 24 and it is to be understood that the foot engageable treadles 262 and 264 may be alternately depressed so as to effect longitudinal extension and retraction of the fluid motor 24 whereby the support arm 16 will be oscillated about its axis of rotation relative to the upright 14. Therefore, the treadle members 262 and 264 may be manipulated by the operator of the machine 10 to raise and lower the free end of the support arm 16 which carries the carcass extractor 38.

In operation, assuming that the free end of the support arm 16 has been swung upwardly beyond the position illustrated in FIGURE 1 to an out-of-the-way position, the mink 286 to be skimmed is first positioned upside down in the center of the frame 108. After the clamp structures 164 of the clamp assemblies 138 and 140 have been radially inwardly displaced and retained in inwardly displaced positions by means of the locking levers 212, the foot pads of the legs 288 of the mink 286 are gripped between the jaw elements 174 and 176 of the right hand clamp assembly 140 illustrated in FIGURE 2 of the drawings and the jaw elements 175 and 177 of the left hand clamp asembly 138 illustrated in FIGURE 2 of the drawings with the foot pads of the mink facing upwardly. In this manner, the mink 286 is supported in an inverted position such as that illustrated in FIGURES 1 and 2 of the drawings. Then, the initial or opening cut 290 in the skin of the mink 286 is made along the rear upwardly facing portions of the legs 288 from the foot pads 164 to the vent 292 of the mink. Thereafter, to complete the opening of the mink, the tail 294 of the mink is grasped by hand and a further cut 293 is made over and down along both sides of the vent 292 down to the cut 290.

After the opening of the mink has been completed, the clamp assemblies 144 and 146 are clampingly engaged with the skin of the mink 286 in the left and right hip areas, see FIGURE 3. Thereafter, the portion of the skin of the mink 286 at the rear of the belly of the mink is clamped in the clamp 142. Thereafter, the extendible motor 24 is actuated to lower the support arm 16 and the carcass extractor 38 supported therefrom and the carcass extractor is inserted down into the opened rear portion of the skin of the mink and engaged with the carcass of the mink.

Prior to this point the tail 294 of the mink 286 has been cradled between the jaw portions 240 and 242 and therefore the jaw portions 78 and 80 may now be engaged with the tail bone 289. Thereafter, the jaw portions 240 and 242 are caused to be clamped about the tail 294 and both foot clams or clamp assemblies 138 and 140 are released, the locking levers 212 having been previously released after engaging the clamp assemblies 138 and 140 with the foot pads of the legs 288 of the mink 286. Thereafter, the extendible motor 24 is actuated to raise the carcass extractor 38 whereupon the rear portion of the carcass is raised until the leg bones and flesh are separated from the skin down to the foot pads. After this step, the leg bones are cut right at the pads so that the operator does not have to remove skin from the flesh by hand in order to cut the leg bones. During this raising of the carcass, the grip of the jaw portions 240 and 242 on the tail and the grip of the jaw portions 78 and 80 with the tail bone enable the tail to be pulled from the tail skin and the carcass to be pulled from the body skin without tearing the tail bone from the carcass.

As soon as the carcass has been lifted out of the skin to the front legs, the front legs are pulled out by hand and then the motor 24 is further actuated to more fully extract the carcass from the skin or hide until all but the head of the carcass is pulled from the hide. Then, a sharp knife is utilized to cut around the ears and the eyes of the mink 286 as the carcass extracter 38 is utilized to pull the carcass completely out of the skin of the mink.

The above skinning operation may be readily carried out by a person skilled with the use of the machine 10 in less than two minutes with all necessary care being taken to avoid injury to the hide or skin.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restorted to, falling within the scope of the invention as claimed.

What is claimed as new is as follows:

1. A small animal skinning machine, said machine including support frame means defining support portions spaced generally radially outwardly of and circumferentially about a center axis, said frame means including a plurality of clamp means supported from said support portions and operable to clampingly engage circumferentially spaced portions of an animal extending along said axis, at least some of said clamp means being supported from said support portions for limited movement generally radially of said axis, and oscillation about corresponding axes generally paralleling said axis.

2. The combination of claim 1 including means operatively connected between said frame means and said some clamp means yieldingly urging said some clamp means toward their radial outermost positions of movement.

3. The combination of claim 2 wherein said frame means and said some clamp means include coacting means operative to releasably retain said clamp means in positions spaced radially inwardly of said radial outermost positions.

4. The combination of claim 1 wherein one pair of said clamp means are disposed generally on opposite end portions of diametric radii of said axis, another of said clamp means is disposed generally on a radius normal to said radii, and another pair of said clamp means are disposed on radii intermediate the first mentioned radii and on opposite sides of a radius diametrically opposite the first mentioned radius.

5. The combination of claim 1 wherein said clamp means include five clamps disposed in relative positions about said axis generally in the one-thirty, three, six, nine and ten-thirty positions of a clock dial.

6. The combination of claim 1 including animal carcass engaging and lifting means adapted to engage an animal carcass for pulling the latter out of its skin and mounted for movement relative to said support frame means generally along said axis.

7. The combination of claim 1 including base means, said support frame means being supported from said base means for rotation about said axis.

8. The combination of claim 1 including means operatively connected between said frame means and said some clamp means yieldingly urging said some clamp means toward their radial outermost positions of movement.

9. A small animal skinning machine, said machine including support frame means defining support portions spaced generally radially outwardly of and circumferentially about a center axis, said frame means including a plurality of clamp means supported from said support portions and operable to clampingly engage circumferentially spaced portions of an animal extending along said axis, animal carcass engaging and lifting means adapted to engage an animal carcass for pulling the latter out of its skin and mounted for movement relative to said support frame means generally along said axis, said animal carcass engaging means also including animal tail bone engaging means.

10. The combination of claim 9 wherein said carcass and tail bone engaging means each comprise self-clamping clamp means operable to automatically clampingly engage said carcass and said tail bone upon raising of said animal carcass engaging means.

11. The combination of claim 10 including motor means drivingly connected to said carcass engaging and lifting means and operative to shift the latter along said axis.

12. The combination of claim 11 including control means for said motor means disposed adjacent said axis and readily operable by a person cutting the skin from an animal carcass supported from said clamp means.

13. An animal skinning machine including a support having portions spaced about an upright axis, at least three clamp means supported from said support portions and operable to clampingly engage circumferentially spaced portions of an animal extending along said axis, said clamp means including coacting clamping surfaces shiftable relative to each other for clampingly engaging portions of said animal therebetween, said clamp means also including corresponding mounting portions spaced further radially outwardly from said upright axis than said clamping surfaces and supported from said support portions for independent oscillation about corresponding axes generally paralleling said upright axis.

14. The combination of claim 13 wherein said support is mounted for oscillation about said upright axis.

15. The combination of claim 14 including animal carcass engaging and lifting means adapted to engage an animal carcass for pulling the latter out of its skin and mounted for movement relative to said support along said upright axis.

References Cited

UNITED STATES PATENTS

| | | |
|---|---|---|
| 1,901,798 | 3/1933 | Boomer. |
| 3,046,597 | 7/1962 | Macy et al. _____ 17—21 |
| 3,336,628 | 8/1967 | Perardi _____ 17—21 |

LUCIE H. LAUDENSLAGER, *Primary Examiner*.